(12) United States Patent
Carlsson et al.

(10) Patent No.: US 9,426,551 B2
(45) Date of Patent: Aug. 23, 2016

(54) DISTRIBUTED WIRELESS SPEAKER SYSTEM WITH LIGHT SHOW

(71) Applicant: SONY CORPORATION, Tokyo (JP)

(72) Inventors: Gregory Peter Carlsson, Santee, CA (US); James R. Milne, Ramona, CA (US); Steven Martin Richman, San Diego, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 14/163,542

(22) Filed: Jan. 24, 2014

(65) Prior Publication Data

US 2015/0215691 A1    Jul. 30, 2015

(51) Int. Cl.
| | |
|---|---|
| *H04R 29/00* | (2006.01) |
| *H04R 25/00* | (2006.01) |
| *H04R 1/02* | (2006.01) |
| *H04R 9/06* | (2006.01) |
| *H05B 37/02* | (2006.01) |
| *H04R 27/00* | (2006.01) |
| *F21V 33/00* | (2006.01) |
| *F21Y 101/02* | (2006.01) |

(52) U.S. Cl.
CPC ............... *H04R 1/028* (2013.01); *H04R 27/00* (2013.01); *H05B 37/0236* (2013.01); *H05B 37/0272* (2013.01); *F21V 33/0056* (2013.01); *F21Y 2101/02* (2013.01); *H04R 2227/003* (2013.01); *H04R 2420/07* (2013.01)

(58) Field of Classification Search
CPC ............ F21V 33/0056; F21Y 2101/02; H04R 1/028H04R 2227/003; H04R 2420/07; H04R 27/00; ; H04R 1/02; H04R 1/026; H04R 29/008; H05B 37/0236; H05B 37/0272
USPC ............... 315/312; 381/332, 59, 390; 340/3.1
See application file for complete search history.

(56) References Cited

U.S. PATENT DOCUMENTS

| | | |
|---|---|---|
| 6,008,777 A | 12/1999 | Yiu |
| 7,085,387 B1 | 8/2006 | Metcalf |
| 7,191,023 B2 | 3/2007 | Williams |
| 7,689,613 B2 | 3/2010 | Candelore |
| 7,792,311 B1 | 9/2010 | Holmgren et al. |
| 7,822,835 B2 | 10/2010 | Atkinson et al. |
| 7,853,022 B2 | 12/2010 | Thompson et al. |
| 8,068,095 B2 | 11/2011 | Pryor |
| 8,077,873 B2 | 12/2011 | Shridhar et al. |
| 8,079,055 B2 | 12/2011 | Hardacker et al. |
| 8,179,755 B2 | 5/2012 | Harris |

(Continued)

FOREIGN PATENT DOCUMENTS

| | | |
|---|---|---|
| JP | 2011004077 A | 1/2011 |
| WO | 2009002292 A1 | 12/2008 |
| WO | 2012164444 A1 | 12/2012 |

OTHER PUBLICATIONS

"Method and System for Discovery and Configuration of Wi-Fi Speakers", http://ip.com/IPCOM/000220175; Dec. 31, 2008.

(Continued)

*Primary Examiner* — Khai N Nguyen
(74) *Attorney, Agent, or Firm* — John L. Rogitz

(57) ABSTRACT

In an audio speaker network, the individual speakers of the network have lamps on them that are controlled to present a light show in synchrony with the audio being played by the system.

20 Claims, 4 Drawing Sheets

(56) References Cited

U.S. PATENT DOCUMENTS

| | | | |
|---|---|---|---|
| 8,199,941 B2 | 6/2012 | Hudson et al. | |
| 8,296,808 B2 | 10/2012 | Hardacker et al. | |
| 8,320,674 B2 | 11/2012 | Guillou et al. | |
| 8,436,758 B2 | 5/2013 | McLaughlin et al. | |
| 8,437,432 B2 | 5/2013 | McLaughlin et al. | |
| 8,438,589 B2 | 5/2013 | Candelore | |
| 8,509,463 B2 | 8/2013 | Goh et al. | |
| 8,553,898 B2 | 10/2013 | Raftery | |
| 8,614,668 B2 | 12/2013 | Pryor | |
| 8,621,498 B2 | 12/2013 | Candelore | |
| 8,629,942 B2 | 1/2014 | Candelore | |
| 8,677,224 B2 | 3/2014 | McLaughlin et al. | |
| 8,760,334 B2 | 6/2014 | McLaughlin et al. | |
| 8,811,630 B2 | 8/2014 | Burlingame | |
| 9,054,790 B2 | 6/2015 | McLaughlin et al. | |
| 9,161,111 B2* | 10/2015 | Yuan | H04R 1/023 |
| 2001/0037499 A1 | 11/2001 | Turock et al. | |
| 2002/0054206 A1 | 5/2002 | Allen | |
| 2002/0122137 A1 | 9/2002 | Chen et al. | |
| 2002/0136414 A1 | 9/2002 | Jordan et al. | |
| 2003/0046685 A1 | 3/2003 | Srinivasan et al. | |
| 2003/0107677 A1 | 6/2003 | Lu et al. | |
| 2003/0210337 A1 | 11/2003 | Hall | |
| 2004/0030425 A1 | 2/2004 | Yeakel et al. | |
| 2004/0068752 A1 | 4/2004 | Parker | |
| 2004/0196140 A1* | 10/2004 | Sid | H05B 37/0272 340/3.1 |
| 2004/0264704 A1 | 12/2004 | Huin et al. | |
| 2005/0024324 A1 | 2/2005 | Tomasi et al. | |
| 2005/0125820 A1 | 6/2005 | Nelson et al. | |
| 2005/0177256 A1 | 8/2005 | Shintani et al. | |
| 2006/0106620 A1 | 5/2006 | Thompson et al. | |
| 2006/0195866 A1 | 8/2006 | Thukral | |
| 2006/0285697 A1 | 12/2006 | Nishikawa et al. | |
| 2007/0297519 A1 | 12/2007 | Thompson et al. | |
| 2008/0002836 A1 | 1/2008 | Moeller et al. | |
| 2008/0025535 A1 | 1/2008 | Rajapakse | |
| 2008/0141316 A1 | 6/2008 | Igoe et al. | |
| 2008/0175397 A1 | 7/2008 | Holman | |
| 2008/0207115 A1 | 8/2008 | Lee et al. | |
| 2008/0259222 A1 | 10/2008 | Hardacker et al. | |
| 2008/0279307 A1 | 11/2008 | Gaffney et al. | |
| 2008/0279453 A1 | 11/2008 | Candelore | |
| 2008/0304677 A1 | 12/2008 | Abolfathi et al. | |
| 2008/0313670 A1 | 12/2008 | Ho et al. | |
| 2009/0037951 A1 | 2/2009 | Candelore et al. | |
| 2009/0041418 A1 | 2/2009 | Candelore et al. | |
| 2009/0060204 A1 | 3/2009 | Reams et al. | |
| 2009/0150569 A1 | 6/2009 | Kumar et al. | |
| 2009/0172744 A1 | 7/2009 | Rothschild | |
| 2009/0313675 A1 | 12/2009 | Howarter et al. | |
| 2010/0220864 A1 | 9/2010 | Martin | |
| 2010/0260348 A1 | 10/2010 | Bhow et al. | |
| 2011/0091055 A1 | 4/2011 | LeBlanc | |
| 2011/0157467 A1 | 6/2011 | McRae | |
| 2011/0270428 A1 | 11/2011 | Tam | |
| 2012/0011550 A1 | 1/2012 | Holland | |
| 2012/0014524 A1 | 1/2012 | Vafiadis | |
| 2012/0058727 A1 | 3/2012 | Cook et al. | |
| 2012/0069868 A1 | 3/2012 | McLaughlin et al. | |
| 2012/0114151 A1 | 5/2012 | Nguyen et al. | |
| 2012/0117502 A1 | 5/2012 | Nguyen et al. | |
| 2012/0120874 A1 | 5/2012 | McLaughlin et al. | |
| 2012/0148075 A1 | 6/2012 | Goh et al. | |
| 2012/0158972 A1 | 6/2012 | Gammill et al. | |
| 2012/0174155 A1 | 7/2012 | Mowrey et al. | |
| 2012/0220224 A1 | 8/2012 | Walker | |
| 2012/0254931 A1 | 10/2012 | Oztaskent et al. | |
| 2012/0291072 A1 | 11/2012 | Maddison et al. | |
| 2012/0320278 A1 | 12/2012 | Yoshitani et al. | |
| 2013/0003822 A1 | 1/2013 | Margulis | |
| 2013/0039514 A1 | 2/2013 | Knowles et al. | |
| 2013/0042292 A1 | 2/2013 | Buff et al. | |
| 2013/0051572 A1 | 2/2013 | Goh et al. | |
| 2013/0052997 A1 | 2/2013 | Killick et al. | |
| 2013/0055323 A1 | 2/2013 | Venkitaraman et al. | |
| 2013/0109371 A1 | 5/2013 | Brogan et al. | |
| 2013/0156212 A1 | 6/2013 | Bjelosevic et al. | |
| 2013/0191753 A1 | 7/2013 | Sugiyama et al. | |
| 2013/0205319 A1 | 8/2013 | Sinha et al. | |
| 2013/0210353 A1 | 8/2013 | Ling et al. | |
| 2013/0223279 A1 | 8/2013 | Tinnakornsrisuphap et al. | |
| 2013/0229577 A1 | 9/2013 | McRae | |
| 2013/0237156 A1 | 9/2013 | Jung et al. | |
| 2013/0238538 A1 | 9/2013 | Cook et al. | |
| 2013/0249791 A1 | 9/2013 | Pryor | |
| 2013/0272535 A1* | 10/2013 | Yuan | H04R 1/023 381/77 |
| 2013/0298179 A1 | 11/2013 | Baum et al. | |
| 2013/0305152 A1 | 11/2013 | Griffiths et al. | |
| 2013/0309971 A1 | 11/2013 | Kiukkonen et al. | |
| 2013/0310064 A1 | 11/2013 | Brachet et al. | |
| 2013/0312018 A1 | 11/2013 | Elliott et al. | |
| 2013/0317905 A1 | 11/2013 | Warner et al. | |
| 2013/0321268 A1 | 12/2013 | Tuck et al. | |
| 2013/0325396 A1 | 12/2013 | Yuen et al. | |
| 2013/0325954 A1 | 12/2013 | Cupala et al. | |
| 2013/0326552 A1 | 12/2013 | Adams | |
| 2013/0332957 A1 | 12/2013 | DeWeese et al. | |
| 2014/0003623 A1 | 1/2014 | Lang | |
| 2014/0003625 A1 | 1/2014 | Sheen et al. | |
| 2014/0004934 A1 | 1/2014 | Peterson et al. | |
| 2014/0009476 A1 | 1/2014 | Venkitaraman et al. | |
| 2014/0011448 A1 | 1/2014 | Yang | |
| 2014/0026193 A1 | 1/2014 | Saxman et al. | |
| 2014/0064492 A1 | 3/2014 | Lakkundi et al. | |
| 2014/0219483 A1 | 8/2014 | Hong | |
| 2014/0362995 A1 | 12/2014 | Backman et al. | |
| 2015/0201295 A1* | 7/2015 | Lau | H04R 29/008 381/59 |
| 2015/0208187 A1 | 7/2015 | Carlsson et al. | |
| 2015/0208190 A1 | 7/2015 | Hooks et al. | |
| 2015/0228262 A1 | 8/2015 | Silfvast et al. | |
| 2015/0271620 A1 | 9/2015 | Lando et al. | |
| 2015/0341737 A1 | 11/2015 | Kallai et al. | |
| 2015/0350804 A1 | 12/2015 | Crockett et al. | |
| 2015/0358707 A1* | 12/2015 | Saijo | H04R 1/028 381/386 |

OTHER PUBLICATIONS

Frieder Ganz, Payam Barnaghi, Francois Carrez, Klaus Moessner, "Context-Aware Management for Sensor Networks", University of Surrey, Guildford, UK publication, 2011.

Sokratis Kartakis, Margherita Antona, Constantine Stephandis, "Control Smart Homes Easily with Simple Touch", University of Crete, Crete, GR, 2011.

Gregory Peter Carlsson, Steven Martin Richman, James R. Milne, "Distributed Wireless Speakers System", file history of related pending U.S. Appl. No. 14/158,396, filed Jan. 17, 2014.

Gregory Peter Carlsson, Steven Martin Richman, James R. Milne, "Distributed Wireless Speaker System with Automatic Configuration Determination When New Speakers Are Added", file history of related pending U.S. Appl. No. 14/159,155, filed Jan. 20, 2014.

James R. Milne, Gregory Peter Carlsson, Steven Martin Richman, Frederick J. Zustak, "Audio Speaker System with Virtual Music Performance", file history of related pending U.S. Appl. No. 14/163,415, filed Jan. 24, 2014.

Gregory Peter Carlsson, Frederick J. Zustak, Steven Martin Richman, James R. Milne, "Wireless Speaker System with Distributed Low (Bass) Frequency", file history of related pending U.S. Appl. No. 14/163,213, filed Jan. 24, 2014.

Gregory Peter Carlsson, Frederick J. Zustak, Steven Martin Richman, James R. Milne, "Wireless Speaker System with Noise Cancelation", File History of related pending U.S. Appl. No. 14/163,089, filed Jan. 24, 2014.

Carlsson, Resch, Vega, "Networked Speaker System with Follow Me", allowed U.S. Appl. No. 14/199,137, filed Mar. 6, 2014.

Robert W. Reams, "N-Channel Rendering: Workable 3-D Audio for 4kTV", AES 135, New York City, 2013.

(56) References Cited

OTHER PUBLICATIONS

James R. Milne, Gregory Peter Carlsson, Steven Martin Richman, Frederick J. Zustak, "Audio Speaker System with Virtual Music Performance", related U.S. Appl. No. 14/163,415, Final Office Action dated Feb. 25, 2016.

Gregory Peter Carlsson, Frederick J. Zustak, Steven Martin Richman, James R. Milne, "Wireless Speaker System with Distributed Low (Bass) Frequency", related U.S. Appl. No. 14/163,213, Final Office Action dated Feb. 23, 2016.

Gregory Peter Carlsson, Keith Resch, Oscar Manuel Vega, "Networked Speaker System with Follow Me", File history of related U.S. Appl. No. 14/974,413, filed Dec. 18, 2015.

James R. Milne, Gregory Carlsson, "Centralized Wireless Speaker System", file history of related U.S. Appl. No. 15/019,111, filed Feb. 9, 2016.

James R. Milne, Gregory Carlsson, "Distributed Wireless Speaker System", file history of related U.S. Appl. No. 15/044,920, filed Feb. 16, 2016.

James R. Milne, Gregory Carlsson, Steven Richman, Frederick Zustak. "Wireless Speaker System", file history of related U.S. Appl. No. 15/044,981, filed Feb. 16, 2016.

James R. Milne, Gregory Peter Calrsson, Steven Martin Richman, Frederick J. Zustak, "Audio Speaker System with Virtual Music Performance", related U.S. Appl. No. 14/163,415, Applicant's response to Final Office Action filed Mar. 16, 2016.

Gregory Peter Calrsson, Frederick J. Zustak, Steven Martin Richman, James R. Milne, "Wireless Speaker System with Distributed Low (Bass) Frequency", related U.S. Appl. No. 14/163,213, Applicant's response to Final Office Action filed Mar. 15, 2016.

* cited by examiner

DISTRIBUTED WIRELESS SPEAKER SYSTEM WITH LIGHT SHOW

FIELD OF THE INVENTION

The present application relates generally to distributed wireless speaker systems with light shows.

BACKGROUND OF THE INVENTION

People who enjoy high quality sound, for example in home entertainment systems, prefer to use multiple speakers for providing stereo, surround sound, and other high fidelity sound. As understood herein, such networks may be used to further promote the entertainment experience using light shows.

SUMMARY OF THE INVENTION

Present principles provide a flexible networked (wired or wireless) speaker system which can use a network address such as a media access control (MAC) address of each individual speaker to create a lighting experience that accompanies music playback on the system. Lighting sequences may be created based on music genre, beat, etc. There can even be fixed modes based on mood or user preferences. Lighting parameters, preferences, and programs may be saved locally and on an internet server. The internet server allows for sharing of lighting programs with others. By having networked-lighting capabilities, there is no need for elaborate computer programs and relay systems. Everything can be controlled via software, and the user can be as involved (creating new programs) or not involved (using existing programs or sharing) as they choose. Also, the networked-lighting can be used to indicate an incoming phone call or an emergency situation.

Accordingly, a device includes at least one computer readable storage medium bearing instructions executable by a processor and at least one processor configured for accessing the computer readable storage medium to execute the instructions to configure the processor for sending lamp control signals to at least a first lamp on a housing of a first speaker in a network of speakers. The instructions also configure the processor for sending lamp control signals to at least a second lamp on a housing of a second speaker in the network of speakers.

In some embodiments the lamp control signals cause the lamps to be energized and deenergized in synchrony with the beat associated with audio played on the system. Plural lamps may be provided on each housing. The lamps can be fixedly attached to the housings or one or more lamps may be removably attached to the respective housing in that the lamp may be engaged and disengaged with the housing using hand pressure without the need for a tool. The lamps may be light emitting diodes (LED). In example implementations each speaker is associated with a network address such that it may addressed separately from the other speakers in the network to energize its respective lamp independently of other lamps of other respective speakers in the network.

In another aspect, a method includes establishing a lamp energization program at least in part based on audio played on plural audio speakers in a network of speakers. The method also includes sending respective lamp control signals to respective lamps on respective speakers in the network of speakers according to the lamp energization program.

In another aspect, a system includes at least one computer readable storage medium bearing instructions executable by a processor which is configured for accessing the computer readable storage medium to execute the instructions to configure the processor for controlling respective lamps on respective audio speakers in an audio speaker network to present a light show in synchrony with audio being played by the audio speaker network.

The details of the present application, both as to its structure and operation, can be best understood in reference to the accompanying drawings, in which like reference numerals refer to like parts, and in which:

DETAILED DESCRIPTION OF THE PREFERRED EMBODIMENT

Figure 1:
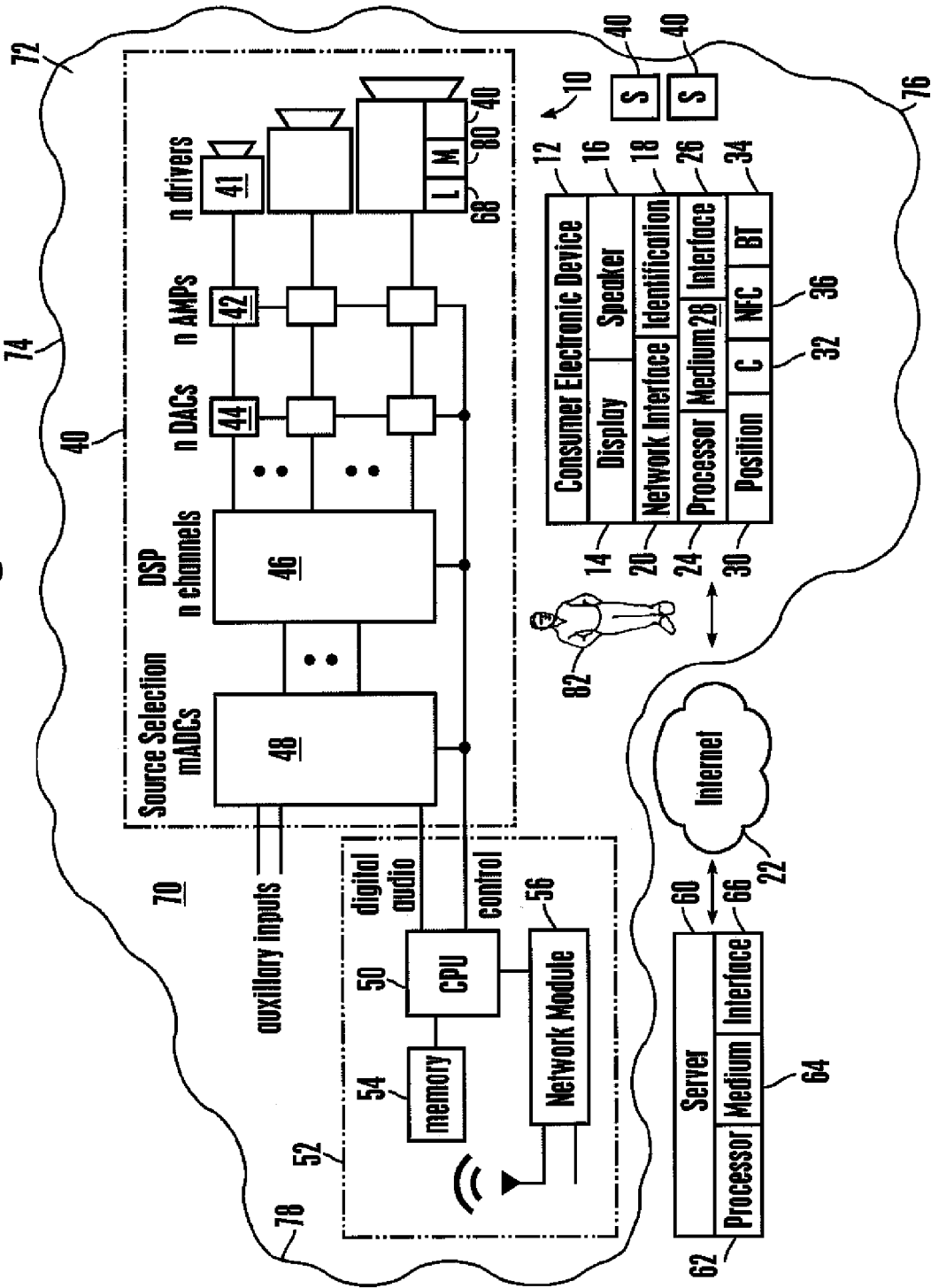
FIG. 1 is a block diagram of an example system including an example in accordance with present principles.

This disclosure relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more tangible computer readable storage medium or memory 28 such as disk-based or solid state storage. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command, etc.) providing input to the processor 24. The CE device 12 may include still other sensors such as e.g. one or more climate sensors (e.g. barometers, humidity sensors, wind sensors, light sensors, temperature sensors, etc.) and/or one or more biometric sensors providing input to the processor 24. In addition to the foregoing, it is noted that in some embodiments the CE device 12 may also include a kinetic energy harvester to e.g. charge a battery (not shown) powering the CE device 12. In some examples the CE device 12 is used to control multiple ("n", wherein "n" is an integer greater than one) speakers 40, each of which receives signals from a respective amplifier 42 over wired and/or wireless links to transduce the signal into sound. Each amplifier 42 may receive over wired and/or wireless links an analog signal that has been converted from a digital signal by a respective standalone or integral (with the amplifier) digital to analog converter (DAC) 44. The DACs 44 may receive, over respective wired and/or wireless channels, digital signals from a digital signal processor (DSP) 46 or other processing circuit. The DSP 46 may receive source selection signals over wired and/or wireless links from plural analog to digital converters (ADC) 48, which may in turn receive appropriate auxiliary signals and, from a control processor 50 of a control device 52, digital audio signals over wired and/or wireless links. The control processor 50 may access a computer memory 54 such as any of those described above and may also access a network module 56 to permit wired and/or wireless communication with, e.g., the Internet. As shown in FIG. 1, the control processor 50 may also communicate with each of the ADCs 48, DSP 46, DACs 44, and amplifiers 42 over wired and/or wireless links. The control device 52, while being shown separately from the CE device 12, may be implemented by the CE device 12. In some embodiments the CE device 12 is the control device and the CPU 50 and memory 54 are distributed in each individual speaker as individual speaker processing units. In any case, each speaker 40 can be separately addressed over a network from the other speakers.

More particularly, in some embodiments, each speaker 40 may be associated with a respective network address such as but not limited to a respective media access control (MAC) address. Thus, each speaker may be separately addressed over a network such as the Internet. Wired and/or wireless communication links may be established between the speakers 40/CPU 50, CE device 12, and server 60, with the CE device 12 and/or server 60 being thus able to address individual speakers, in some examples through the CPU 50 and/or through the DSP 46 and/or through individual processing units associated with each individual speaker 40, as may be mounted integrally in the same housing as each individual speaker 40. Thus, as alluded to above, the CPU 50 may be distributed in individual processing units in each speaker 40.

The CE device 12 and/or control device 52 (when separate from the CE device 12) and/or individual speaker trains (speaker+amplifier+DAC+DSP, for instance) may communicate over wired and/or wireless links with the Internet 22 and through the Internet 22 with one or more network servers 60. Only a single server 60 is shown in FIG. 1. A server 60 may include at least one processor 62, at least one tangible computer readable storage medium 64 such as disk-based or solid state storage, and at least one network interface 66 that, under control of the processor 62, allows for communication with the other devices of FIG. 1 over the network 22, and indeed may facilitate communication between servers and client devices in accordance with present principles. Note that the network interface 66 may be, e.g., a wired or wireless modem or router, Wi-Fi transceiver, or other appropriate interface such as, e.g., a wireless telephony transceiver.

Accordingly, in some embodiments the server 60 may be an Internet server, may include and perform "cloud" functions such that the devices of the system 10 may access a "cloud" environment via the server 60 in example embodiments. In a specific example, the server 60 downloads a software application to the CE device 12 for control of the speakers 40 according to logic below. The CE device 12 in turn can receive certain information from the speakers 40, such as their GPS location, and/or the CE device 12 can receive input from the user, e.g., indicating the locations of the speakers 40 as further disclosed below. Based on these inputs at least in part, the CE device 12 may execute the speaker optimization logic discussed below, or it may upload the inputs to a cloud server 60 for processing of the optimization algorithms and return of optimization outputs to the CE device 12 for presentation thereof on the CE device 12, and/or the cloud server 60 may establish speaker configurations automatically by directly communicating with the speakers 40 via their respective addresses, in some cases through the CE device 12. Note that if desired, each speaker 40 may include a respective one or more lamps 68 that can be illuminated on the speaker.

Typically, the speakers 40 are disposed in an enclosure 70 such as a room, e.g., a living room. Note that each speaker or a group of speakers may themselves be located in a speaker enclosure with the room enclosure 70. For purposes of disclosure, the enclosure 70 has (with respect to the example orientation of the speakers shown in FIG. 1) a front wall 72, left and right side walls 74, 76, and a rear wall 78. One or more listeners 82 may occupy the enclosure 70 to listen to audio from the speakers 40. One or microphones 80 may be arranged in the enclosure for measuring signals representative of sound in the enclosure 70, sending those signals via wired and/or wireless links to the CPU 50 and/or the CE device 12 and/or the server 60. In the non-limiting example shown, each speaker 40 supports a microphone 80, it being understood that the one or more microphones may be arranged elsewhere in the system if desired.

The location of the walls 72-78 may be input by the user using, e.g., a user interface (UI) in which the user may draw, as with a finger or stylus on a touch screen display 14 of a CE device 12, the walls 72-78 and locations of the speakers 40. Or, the position of the walls may be measured by emitting pings, including a frequency sweep of pings, in sequence from each of the speakers 40 as detected by each of the microphones 80 and/or from the microphone 18 of the CE device 12, determining, using the formula distance=speed of sound multiplied by time until an echo is received back, the distance between the emitting microphone and the walls returning the echoes. Note in this embodiment the location of each speaker (inferred to be the same location as the associated microphone) is known as described above. By computationally modeling each measured wall position with the known speaker locations, the contour of the enclosure 70 can be approximately mapped.

Note that the CPU 50 and/or CE device 12 and/or cloud server 60 may function as a lamp controller according to present principles. Or, a physically separate lamp controller may be provided to receive lamp control signals from, e.g., the CPU 50 and output energization signals to the lamps 68.

Figure 2:
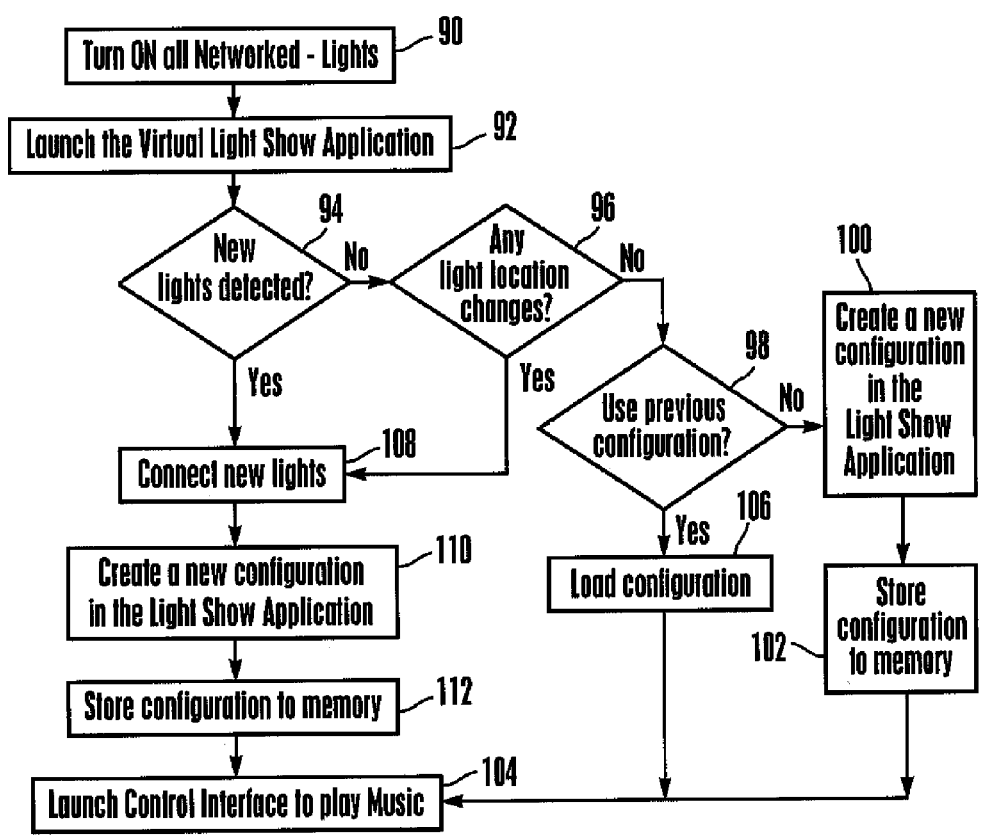
FIGS. 2 and 2A are flow charts of example logic according to present principles.

Now referring to FIG. 2, a flow chart of example logic is shown. The logic shown in FIG. 2 may be executed by one or more of the CPU 50, the CE device 12 processor 24, and the server 60 processor 62. Note that "lamp" and "light" may be used interchangeably in their noun form herein. At block 90, all of the lamps 68 may be energized and the logic below launched via an application executing, for example, on the CE device 12 as received from the cloud server 60.

At decision diamond 94, it is determined whether any new lamps are detected in the system. This may be done in one of several ways. The CE device 12 may, for example, image the system with lamps illuminated and compare the image to prestored templates showing previously illuminated lamps in the system. And/or, each speaker, in part owing to it being separately addressable from the other speakers, can report (through the CPU 50 and/or DSP channels 46 as proxy if desired) how many lamps it has illuminated, and if the number of reported lamps for any particular speaker exceeds a number of lamps previously reported for that speaker, the test at decision diamond 94 is positive; otherwise it is negative. Similarly, when the test at decision diamond 94 is negative the logic may flow to decision diamond 96 to determine whether any lamp location has changed, again either by image recognition and/or based on reports from the speakers as to whether a lamp has been moved on the housing.

If no new lamps have been added and no lamps have new positions relative to their prior positions, the logic proceeds to decision diamond 98 to determine whether a previous light show is to be used. The test may be negative owing to user input indicating a desire to create a new light show or it may be negative owing to no prior light shows existing. If the test at decision diamond 98 is negative, a new light show is created at block 100.

Figure 2A:
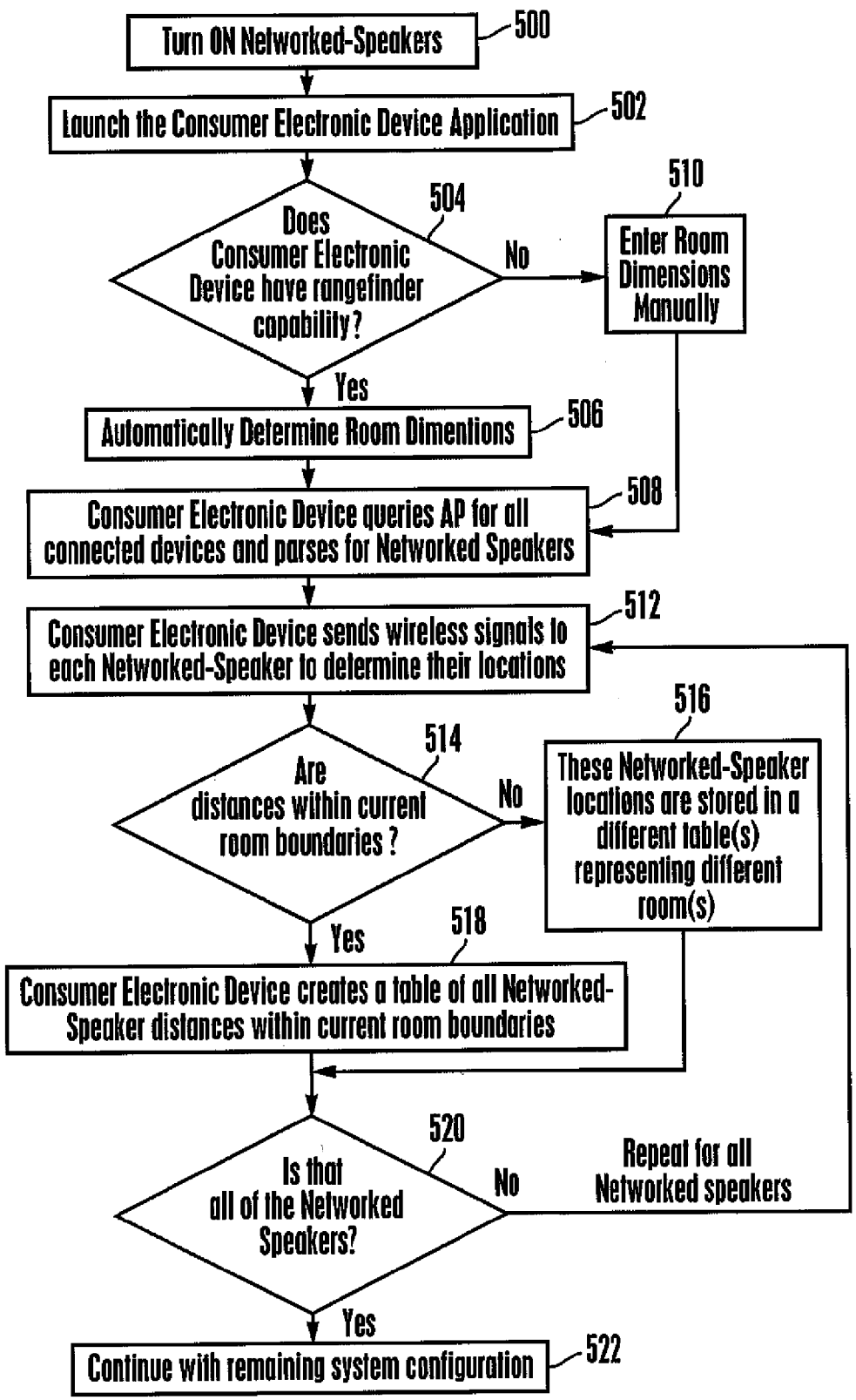

FIG. 2A illustrates supplemental logic in addition to or in lieu of some of the logic disclosed elsewhere herein that may be employed in example non-limiting embodiments to discover and map speaker location and room (enclosure 70) boundaries. Commencing at block 500, the speakers are energized and a discovery application for executing the example logic below is launched on the CE device 12. If the CE device 12 has range finding capability at decision diamond 504, the CE device (assuming it is located in the enclosure) automatically determines the dimensions of the enclosure in which the speakers are located relative to the current location of the CE device 12 as indicated by, e.g., the GPS receiver of the CE device. Thus, not only the contours but the physical locations of the walls of the enclosure are determined. This may be executed by, for example, sending measurement waves (sonic or radio/IR) from an appropriate transceiver on the CE device 12 and detecting returned reflections from the walls of the enclosure, determining the distances between transmitted and received waves to be one half the time between transmission and reception times the speed of the relevant wave. Or, it may be executed using other principles such as imaging the walls and then using image recognition principles to convert the images into an electronic map of the enclosure.

From block 506 the logic moves to block 508, wherein the CE device queries the speakers, e.g., through a local network access point (AP), by querying for all devices on the local network to report their presence and identities, parsing the respondents to retain for present purposes only networked audio speakers. On the other hand, if the CE device does not have rangefinding capability the logic moves to block 510 to prompt the user of the CE device to enter the room dimensions.

From either block 508 or block 510 the logic flows to block 512, wherein the CE device 12 sends, e.g., wirelessly via Bluetooth, Wi-Fi, or other wireless link a command for the speakers to report their locations. These locations may be obtained by each speaker, for example, from a local GPS receiver on the speaker, or a triangulation routine may be coordinated between the speakers and CE device 12 using ultra wide band (UWB) principles. UWB location techniques may be used, e.g., the techniques available from DecaWave of Ireland, to determine the locations of the speakers in the room. Some details of this technique are described in Decawave's USPP 20120120874, incorporated herein by reference. Essentially, UWB tags, in the present case mounted on the individual speaker housings, communicate via UWB with one or more UWB readers, in the present context, mounted on the CE device 12 or on network access points (APs) that in turn communicate with the CE device 12. Other techniques may be used.

The logic moves from block 512 to decision diamond 514, wherein it is determined, for each speaker, whether its location is within the enclosure boundaries determined at block 506. For speakers not located in the enclosure the logic moves to block 516 to store the identity and location of that speaker in a data structure that is separate from the data structure used at block 518 to record the identities and IDs of the speakers determined at decision diamond 514 to be within the enclosure. Each speaker location is determined by looping from decision diamond 520 back to block 512, and when no further speakers remain to be tested, the logic concludes at block 522 by continuing with any remaining system configuration tasks divulged herein.

Figure 3:
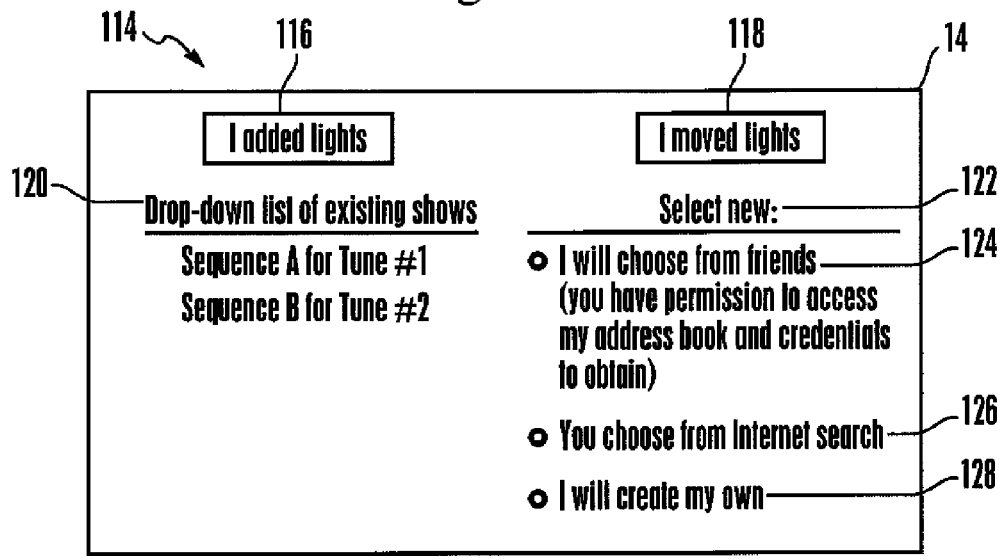
FIGS. 3 and 4 are example user interfaces (UI) according to present principles.

To create a new light show, the UI of FIG. 3 may be employed. This is but one non-limiting example of an algorithm (e.g., based on user input and selection from a friend) that may be employed to execute the logic at block 100. An example user interface (UI) 114 may be displayed on the CE device display 14 and may include a selector element 116 in the upper portion indicating that the user added lights to the system 10, thus resulting in a positive determination at decision diamond 94. The UI 114 may also include a selector element 118 in the upper portion that the user may select to indicate a change in location of one or plural light(s), thus resulting in a positive determination at decision diamond 96.

The test at decision diamond 98 reaching a positive determination may allow the user to select a previously stored configuration from a drop-down list 120 in UI 114. Various configurations, or sequences of light illuminations to create a show, may correspond to specific songs. The user may choose not to use a previously stored configuration at decision diamond 98 and may select a new type of configuration from a drop-down list 122.

A selector element 124 may allow the user to choose a configuration from friends via a network I/F 20. Selection of this element 124 implies that the user gives the processor 24 permission to access the user's address book and credentials to obtain configurations from the user's friends for selection. The user may alternatively select element 126, indicating the user's desire for the processor 24 to access and select configurations stored on the Internet, for example, in a database of light show configurations, over the network I/F 20. Or, the user may choose to create a personalized configuration by selecting element 128. Example methods for creation of such a configuration are illustrated in FIG. 4.

Figure 4:
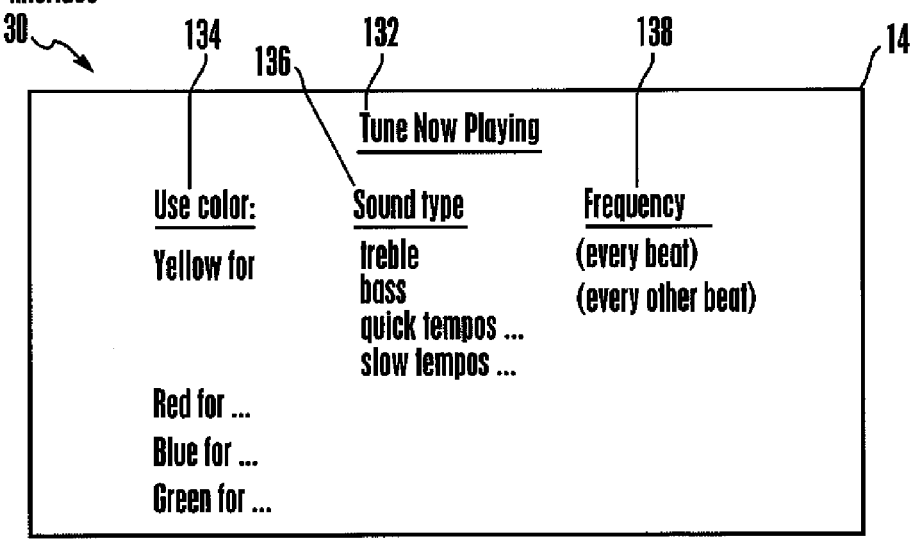

A UI 130 may be displayed on the CE device display 14 as illustrated in FIG. 4 and may be headed with a title 132 indicating the UI 130 pertains to the tune currently playing. The user may select a particular color or light from a colors list 134 to be illuminated when a certain type of sound, selected by the user from sound type list 136, is played and to be illuminated at a specific frequency, selected by the user from frequency list 138. For example, the user may choose to illuminate every other bass beat with red lights.

While the particular DISTRIBUTED WIRELESS SPEAKER SYSTEM WITH LIGHT SHOW is herein shown and described in detail, it is to be understood that the subject matter which is encompassed by the present invention is limited only by the claims.

What is claimed is:

1. A device comprising:
    at least one computer memory that is not a transitory signal and that comprises instructions executable by at least one processor for:
    sending lamp control signals to at least a first lamp on a housing of a first speaker in a network of speakers according to a first light show configuration;
    sending lamp control signals to at least a second lamp on a housing of a second speaker in the network of speakers according to the first light show configuration;

determining whether any new lamps are detected in the network of speakers and/or determining whether a location of the first lamp or second lamp has changed; and responsive to determining that at least one new lamp is detected in the network of speakers and/or determining that a location of the first lamp or second lamp has changed, establishing a new light show configuration.

2. The device of claim 1, wherein the lamp control signals cause the lamps to be energized and deenergized in synchrony with the a beat associated with audio played on the system.

3. The device of claim 1, comprising plural lamps on each housing.

4. The device of claim 3, wherein the lamps are fixedly attached to the housings.

5. The device of claim 3, wherein at least one lamp is removably attached to the respective housing, the lamp being removably attached in that it may be engaged and disengaged with the housing using hand pressure without the need for a tool.

6. The device of claim 1, wherein the lamps are light emitting diodes (LED).

7. The device of claim 1, wherein each speaker is associated with a network address such that it may addressed separately from the other speakers in the network to energize its respective lamp independently of other lamps of other respective speakers in the network.

8. Method comprising:
establishing a lamp energization program for plural audio speakers in a network of speakers;
sending respective lamp control signals to respective lamps on respective speakers in the network of speakers according to the lamp energization program; and
presenting on a display at least one user interface (UI) comprising:
at least a first element selectable for indicating that new lamps have been added to the network of speakers; and/or
at least a second element selectable to indicate a change in location of at least one of the lamps in the network of speakers; and
at least a third element presenting a list of at least one lamp energization program and operable to permit a user to select a lamp energization program from the third element according to which the lamp control signals are established.

9. The method of claim 8, wherein the lamp energization program is based on a rhythm of the audio.

10. The method of claim 8, comprising sending lamp control signals to plural lamps on each speaker.

11. The method of claim 8, wherein the lamps are fixedly attached to the speakers.

12. The method of claim 8, wherein at least one lamp is removably attached to the respective speaker, the lamp being removably attached in that it may be engaged and disengaged with the speaker using hand pressure without the need for a tool.

13. The method of claim 8, wherein the lamps are light emitting diodes (LED).

14. The method of claim 8, comprising addressing the lamp control signals to network addresses of the respective speakers.

15. System comprising:
at least one computer memory that is not a transitory signal and that comprises instructions executable by at least one processor for:
controlling respective lamps on respective audio speakers in an audio speaker network to present a light show in synchrony with audio being played by the audio speaker network; and
presenting on a display at least one user interface (UI) comprising:
information indicating the UI pertains to the tune currently playing in the audio speaker network;
at least a first element operable to permit a user to select a particular color from a list of colors to be illuminated when a certain type of sound is played in the audio speaker network
at least a second element operable to permit a user to select the certain type of sound with which the particular color to be illuminated is associated.

16. The system of claim 15, wherein the instructions are executable to send to the lamps lamp control signals to cause the lamps to be energized and deenergized in synchrony with the a beat associated with audio played on the system.

17. The system of claim 15, comprising the speakers and plural lamps on each speaker.

18. The system of claim 17, wherein the lamps are fixedly attached to the speakers.

19. The system of claim 17, wherein at least one lamp is removably attached to the respective speaker, the lamp being removably attached in that it may be engaged and disengaged with the speaker using hand pressure without the need for a tool.

20. The system of claim 17, wherein each speaker is associated with a network address such that it may addressed separately from the other speakers in the network to energize its respective lamp independently of other lamps of other respective speakers in the network.

* * * * *